(12) United States Patent
Westfall (10) Patent No.: US 11,104,261 B2
(45) Date of Patent: Aug. 31, 2021

(54) SEAT AND CARGO MODULE QUICK ATTACHMENT METHOD

(71) Applicant: Ford Global Technologies, LLC, Dearborn, MI (US)

(72) Inventor: Christopher Robert Westfall, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 15/971,155

(22) Filed: May 4, 2018

(65) Prior Publication Data

US 2019/0337440 A1    Nov. 7, 2019

(51) Int. Cl.
  *B60P 7/08*  (2006.01)
  *F16B 21/09*  (2006.01)

(52) U.S. Cl.
  CPC ............ *B60P 7/0815* (2013.01); *F16B 21/09* (2013.01)

(58) Field of Classification Search
  CPC ......... B60P 7/0815; B60P 7/0892; B60P 7/14; B60P 3/40; B60P 7/135; B60P 7/15
  USPC ....... 410/104, 121, 129, 100, 105, 107, 117, 410/97, 94, 91, 149
  See application file for complete search history.

(56) References Cited

U.S. PATENT DOCUMENTS

| | | | | |
|---|---|---|---|---|
| 1,739,829 | A * | 12/1929 | Fedderman | B60P 3/073 410/22 |
| 3,282,229 | A * | 11/1966 | Elsner | B60P 7/0815 410/105 |
| 4,020,770 | A * | 5/1977 | McLennan | B60P 7/0815 410/105 |
| 4,027,892 | A * | 6/1977 | Parks | B60P 7/0815 410/3 |
| 5,167,479 | A | 12/1992 | Bott | |
| 6,007,283 | A | 12/1999 | Labeur | |
| 6,503,036 | B1 | 1/2003 | Bequette et al. | |
| 6,585,465 | B1 | 7/2003 | Hammond et al. | |
| 6,648,569 | B2 * | 11/2003 | Douglass | B60P 1/003 410/46 |
| 7,416,234 | B2 * | 8/2008 | Bequette | B60P 1/003 296/26.08 |
| 2002/0119023 | A1 * | 8/2002 | Delay | B60P 7/0815 410/121 |
| 2009/0226276 | A1 | 9/2009 | Lenz | |
| 2014/0271021 | A1 * | 9/2014 | Cardona | B60N 2/01558 410/104 |
| 2016/0107542 | A1 * | 4/2016 | Trimble | B60N 2/01575 296/65.03 |

* cited by examiner

*Primary Examiner* — D Glenn Dayoan
*Assistant Examiner* — Sunsurraye Westbrook
(74) *Attorney, Agent, or Firm* — David Coppiellie; Price Heneveld LLP (57) ABSTRACT

A vehicular module attachment assembly includes a vehicular cabin module having a peg that includes a foot. A locking device is slidably coupled to the peg. A slot is formed in a cabin floor including first and second grooves configured to retain the foot. The locking device adjusts between an unlocked position, wherein the peg is slidable between the first and second grooves, and a locked position, wherein the peg is retained in the second groove.

17 Claims, 8 Drawing Sheets

SEAT AND CARGO MODULE QUICK ATTACHMENT METHOD

FIELD OF THE DISCLOSURE

The present disclosure generally relates to the interior capabilities of a vehicle, and more particularly, a quick attachment method and assembly for vehicular cabin modules.

BACKGROUND OF THE DISCLOSURE

In an effort to increase carrying capabilities and passenger comfort, vehicles may be equipped with various cabin modules configured to enable alternative carrying configurations within the vehicle cabin. However, current vehicle configurations offer little variety and interchangeability in regards to the vehicle cabin. Furthermore, it is often laborious and time consuming to switch out the modules or seating configurations within a vehicle cabin. As such, it would be beneficial to tailor the cabin of a vehicle in order to optimize the variety and interchangeability offered by provide quick attachment assembly for vehicular cabin modules. The present disclosure is intended to satisfy this need.

SUMMARY OF THE DISCLOSURE

According to one aspect of the present disclosure, a vehicular module attachment assembly includes a vehicular cabin module having a peg that includes a foot. A locking device is slidably coupled to the peg. A slot is formed in a cabin floor including first and second grooves configured to retain the foot. The locking device adjusts between an unlocked position, wherein the peg is slidable between the first and second grooves, and a locked position, wherein the peg is retained in the second groove.

Embodiments of the first aspect of the disclosure can include any one or a combination of the following features:
- the second groove is configured to prevent vertical displacement of the foot from the slot when the foot is retained in the second groove;
- a diameter of the first groove is greater than a diameter of the second groove;
- a diameter of the foot is greater than the diameter of the second groove, and a diameter of the peg is less than the diameter of the second groove;
- the first and second grooves comprise a t-slot, the foot configured to slide within the t-slot between the first and second grooves;
- the cabin module is a seating assembly module;
- a plurality of slots formed in the cabin floor, the plurality of slots forming an array;
- the locking device comprises a handle configured to enable a user to slide the foot about the peg; and
- the peg comprises a stop configured to prevent the foot from being displaced from the locked position.

According to another aspect of the present disclosure, a vehicular module attachment assembly includes a plurality vehicular cabin modules removably coupled to a cabin floor at a plurality of slots including first and second grooves. Each of the plurality of modules includes a peg insertable into the first groove and movable into the second groove vertically retaining the peg. A locking device coupled is to the peg. The locking device is slidable to a lock position retaining the peg horizontally.

Embodiments of the second aspect of the disclosure can include any one or a combination of the following features:
- each of the slots comprise a t-slot;
- at least one of the plurality of vehicular cabin modules comprises a seating assembly module;
- the plurality of slots comprise an array disposed upon the cabin floor; and
- the locking device is configured to prevent the peg from sliding into the first groove.

According to yet another aspect of the present disclosure, a method of retaining an interior vehicular module includes inserting a peg of the module having a foot into a first groove of a cabin floor slot. The peg is slid from the first groove into a second groove of the slot, preventing vertical displacement of the peg. A locking device is coupled to the peg into the first groove, preventing the peg from sliding into the first groove.

Embodiments of the third aspect of the disclosure can include any one or a combination of the following features:
- a seating assembly module;
- locking the locking device in the first groove;
- the foot is slidably coupled to the peg;
- the slot comprises a t-slot, and the foot is configured to slide within the t-slot; and
- preventing displacement of the module from the slot.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
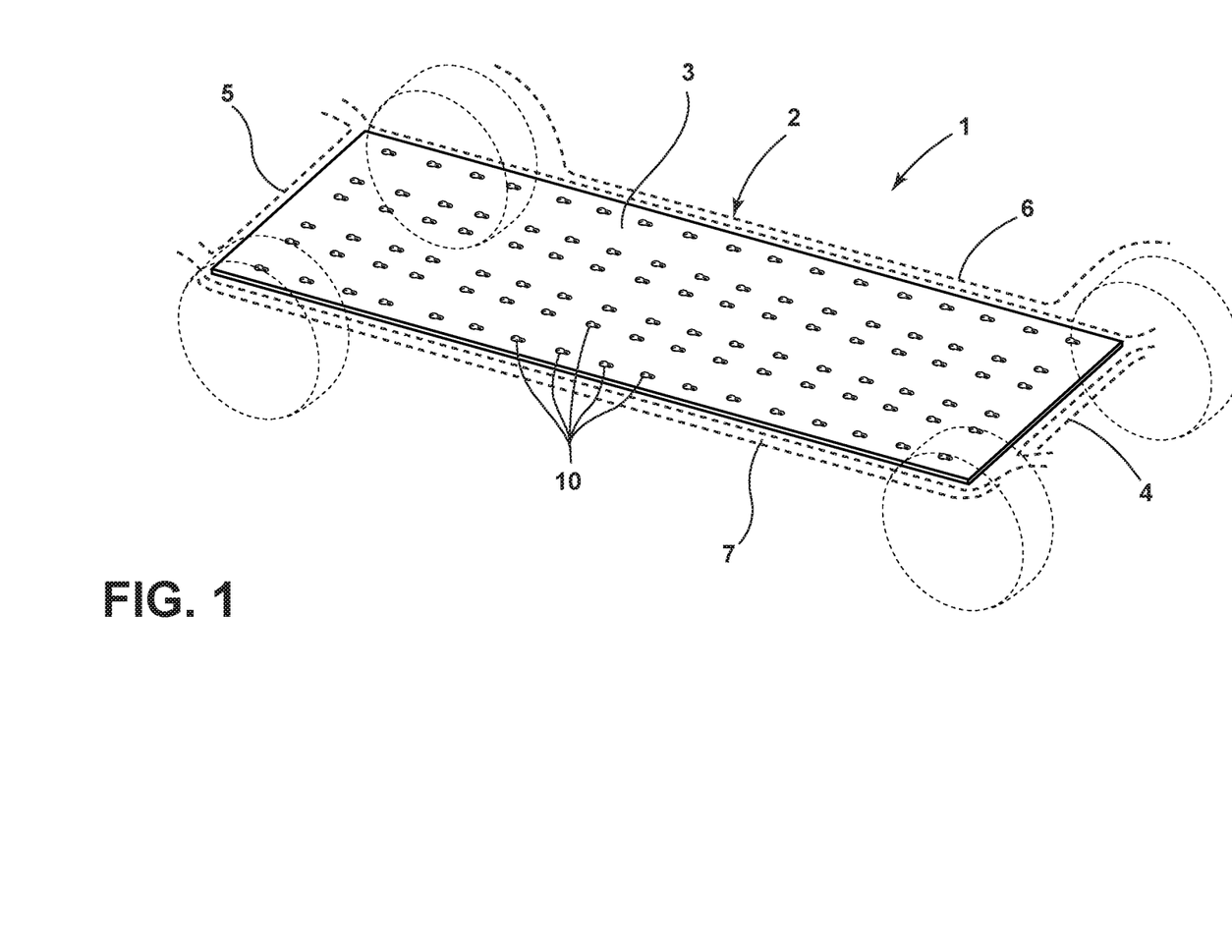
FIG. 1 is a perspective view of a vehicle cabin including a vehicular module attachment assembly.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The following disclosure describes a vehicular module attachment assembly. The vehicular module attachment assembly is adapted for coupling various vehicular modules to a cabin floor. In some instances, the vehicular modules may include a removable seating assembly or, alternatively, a cargo retainer module. The vehicular module attachment assembly includes a plurality of slots formed within the cabin floor. Each vehicular module may be equipped with at least one peg configured to couple the module to the cabin floor. The peg may be removably coupled to one of the plurality of slots in order to retain the vehicular module to the cabin floor. Further, a locking device may be configured to be adjusted between a locked and an unlocked position in order to prevent uncoupling of the peg from the cabin floor. In this way, the vehicle cabin may be quickly modified to include additional or alternative seating and/or cargo configurations. Alternatively, the seating and/or cargo configurations may be quickly removed in order to make room for additional cargo or to include alternative cabin modules that may be beneficial to passenger comfort or experience.

Referring to FIG. 1, a vehicular module attachment assembly 1 within a vehicle cabin 2 is shown. The vehicular module attachment assembly 1 includes a plurality of slots 10 formed in a cabin floor 3. Each of the plurality of slots 10 may be equidistantly positioned to form an array along the cabin floor 3. The array of slots 10 may extend from a front portion 4 to a rear portion 5 of the vehicle cabin 2, and from a driver-side wall 6 to a passenger-side wall 7 of the vehicle cabin 2. The slots 10 may be distributed as rows and columns along the cabin floor 3. It will be recognized by those in the art that the distance between each of the plurality of slots 10 may vary depending upon the intended use of the vehicle and/or the requirements of the vehicular modules. As will be discussed in greater detail below, each of the plurality of slots 10 is configured to secure a vehicular module to the cabin floor 3. Examples of vehicular modules are further discussed in reference to FIGS. 4A and 4B. Further, each module is equipped with a peg that may be removably coupled to the slot 10 in order to facilitate quick attachment of a variety of vehicular modules.

Figure 2:
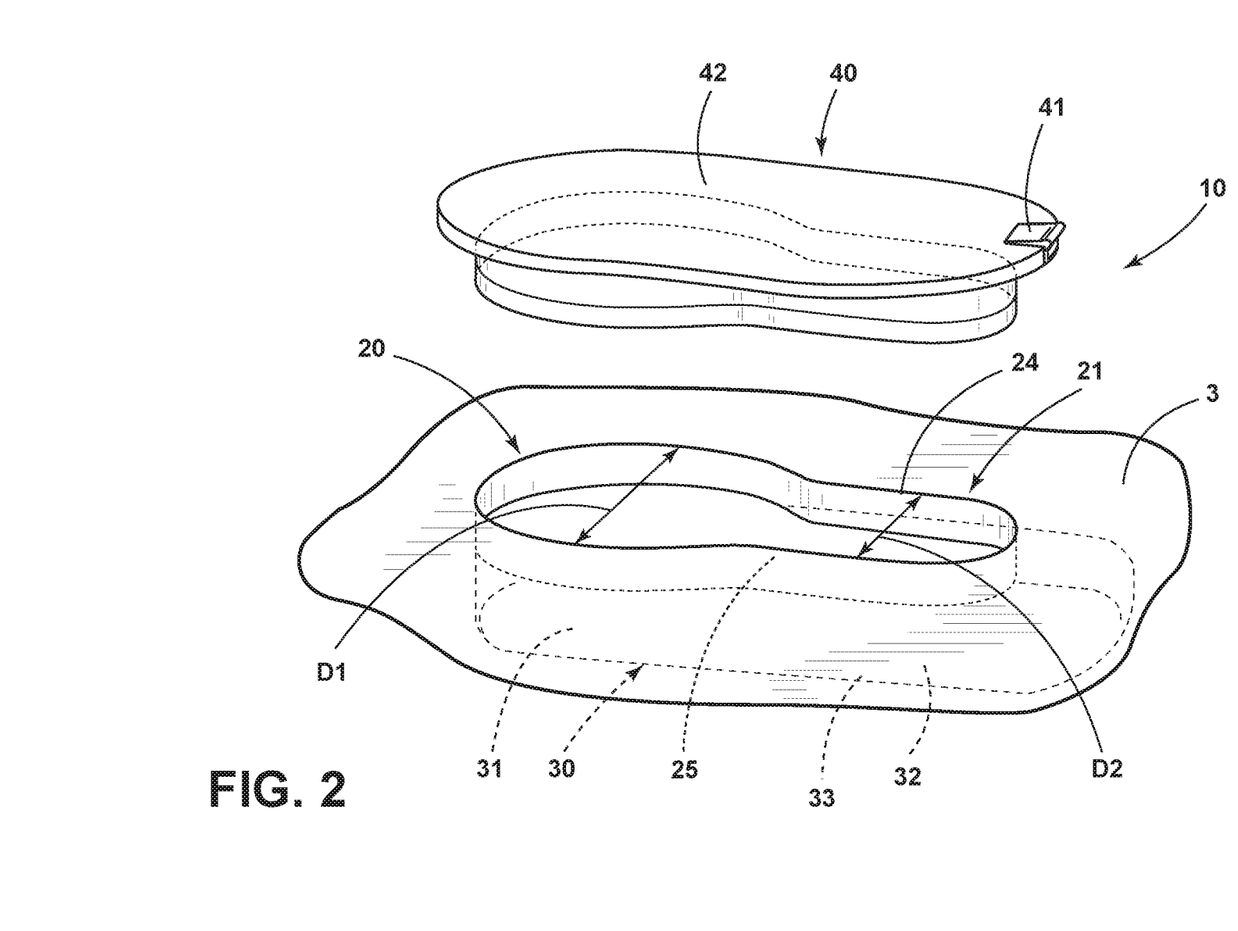
FIG. 2 illustrates a slot of the vehicular module attachment assembly formed in a vehicle cabin floor and including a removable plug for concealing the slot.

Referring to FIG. 2, each of the plurality of slots 10 defines a hollowed-out portion of the cabin floor 3. Each slot 10 may be generally adapted with a t-slot configuration including a first groove 20 and a second groove 21. Each slot 10 includes a first diameter D1 defining the width of the first groove 20, and a second diameter D2 defining the width of the second groove 21. The first diameter D1 may be wider than the second diameter D2. Further, each slot 10 may include a channel 30 extending below the first and second grooves 20, 21, with a surface of the channel 30 defining a slot floor 33. The channel 30 may include a first portion 31 subjacent to the first groove 20 and a second portion 32 subjacent to the second groove 21. Further, the width of the channel 30 may be at least equal to the diameter of the first groove 20. First and second bowed ledges 24, 25 may define a periphery of the second groove 21, and may be configured to partially enclose the channel 30 beneath the second groove 21. As will be discussed below, the shape and configuration of the slot 10 may vary depending upon the vehicular cabin requirements and the configuration of the intended vehicular modules.

With continued reference to FIG. 2, each of the plurality of slots 10 may be configured to accommodate a removable plug 40, which conceals the slot 10 along the cabin floor 3. The plug 40 may include a tab 41 for assisting in removing the plug 40 from the slot 10. A top surface 42 of the plug 40 may be configured to lie flush with the cabin floor 3 in order to create a level surface when the plug 40 is inserted into the slot 10. As such, the plug 40 may be configured to conceal the slot 10 in order to prevent any obstruction to passengers caused by the slot 10 in the absence of the plug 40. That being said, the slot 10 may be concealed by a slide cover integrated with the cabin floor 3, or alternatively, a floor mat configured to conceal multiple slots along the surface of the cabin floor 3.

Figure 3A:
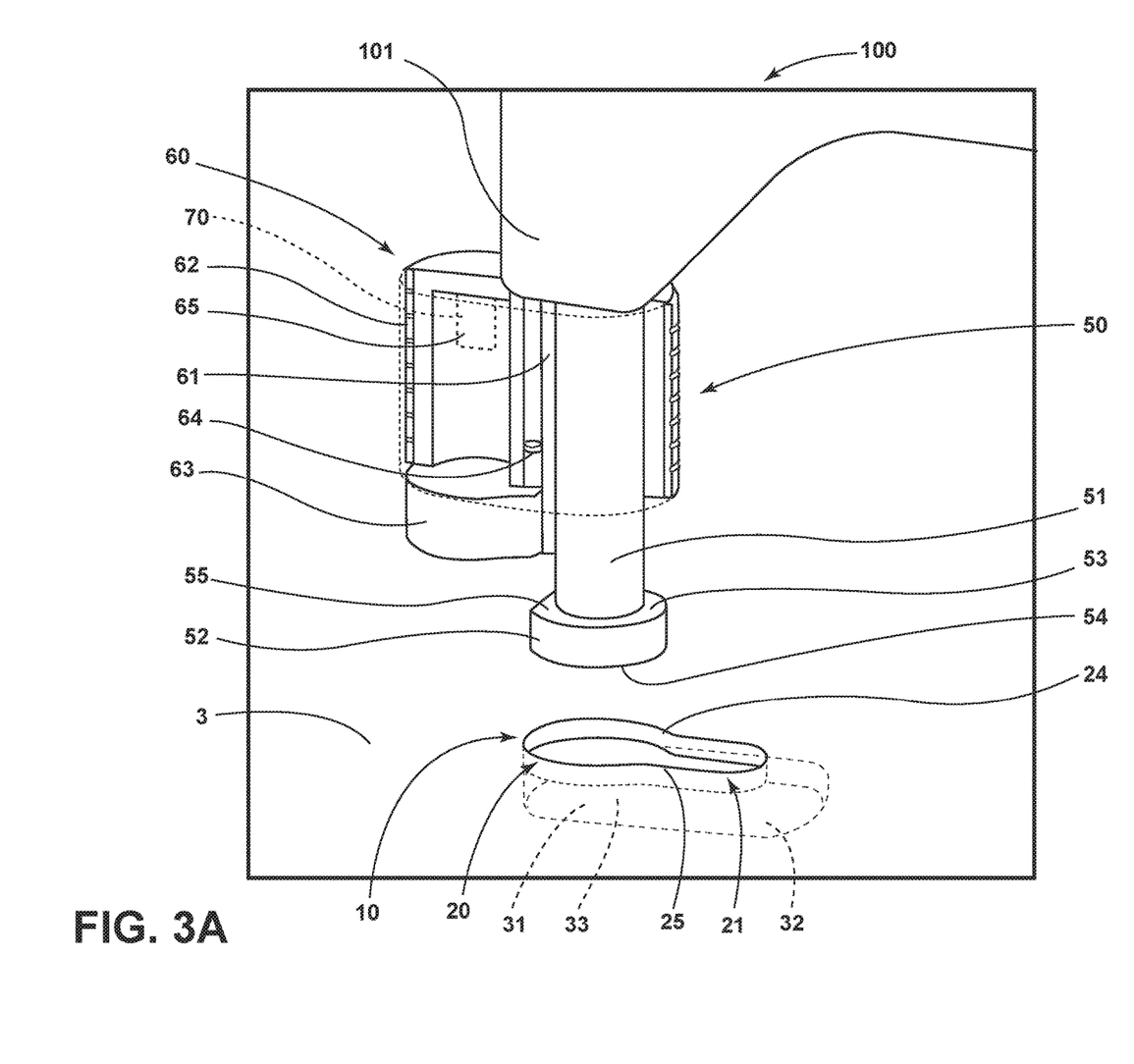
FIG. 3A illustrates a vehicular cabin module including a peg for coupling the vehicular module to the slot.
Figure 3B:
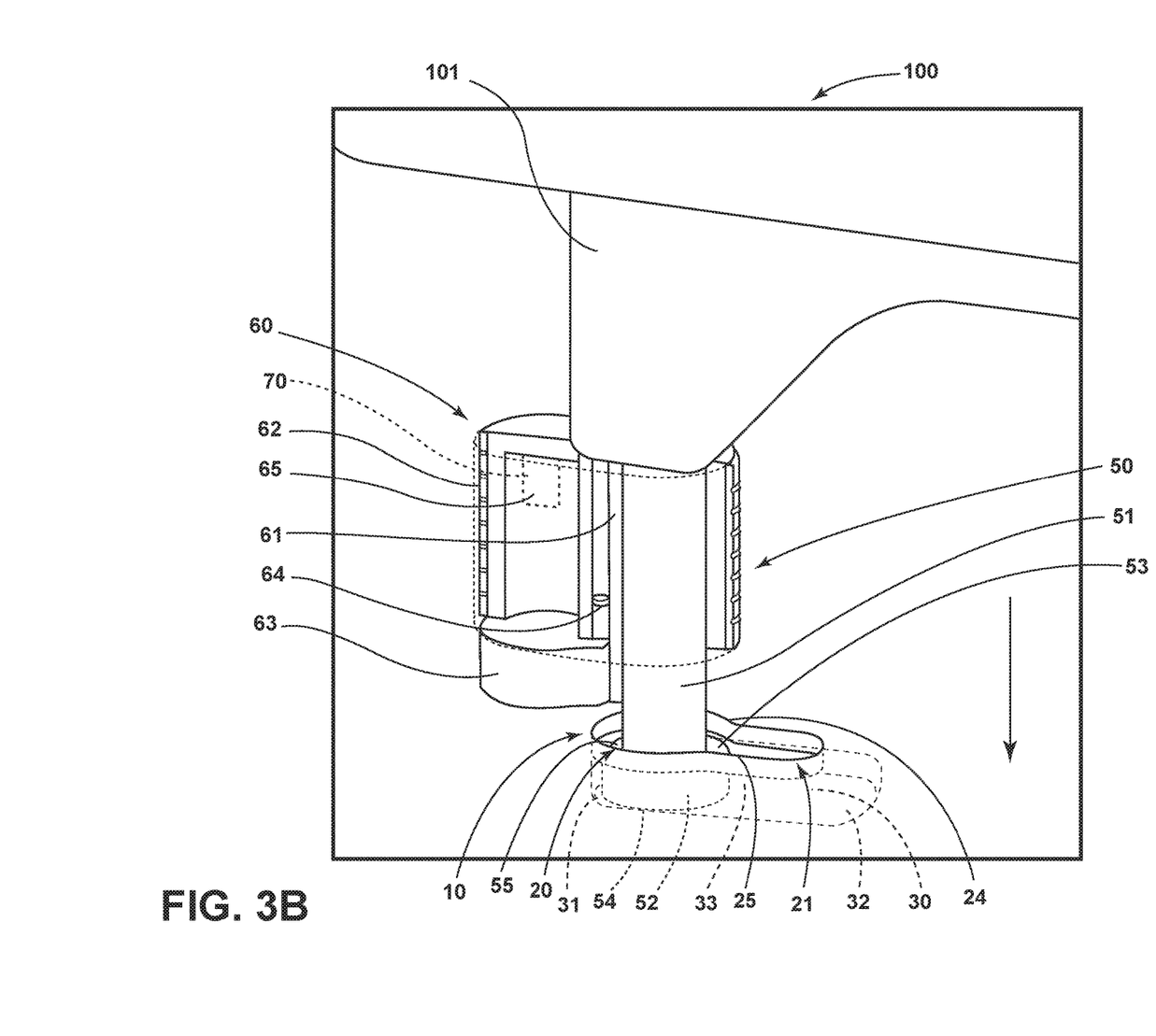
FIG. 3B illustrates the peg of the vehicular cabin module inserted into a first groove of the slot.

Referring to FIGS. 3A-D, each vehicular module 100 is configured to be secured to the cabin floor 3 by at least one of the plurality of slots 10. The vehicular module 100 may include at least one peg 50 extending downwardly from a module frame 101. The peg 50 may include an elongated shaft 51 having an annular foot 52 protruding from a lower end of the shaft 51. An upper surface 55 of the annular foot 52 may form a lip 53 around the elongated shaft 51. The vehicular module 100 may be lowered such that the annular foot 52 is insertable into the first groove 20 of the slot 10. The first portion 31 of the channel 30 may be configured to accommodate the annular foot 52, and a bottom surface 54 of the annular foot 52 may frictionally engage the slot floor 33 (FIG. 3B). As such, the diameter of the annular foot 52 may be less than the diameter of the first groove 20.

Figure 3C:
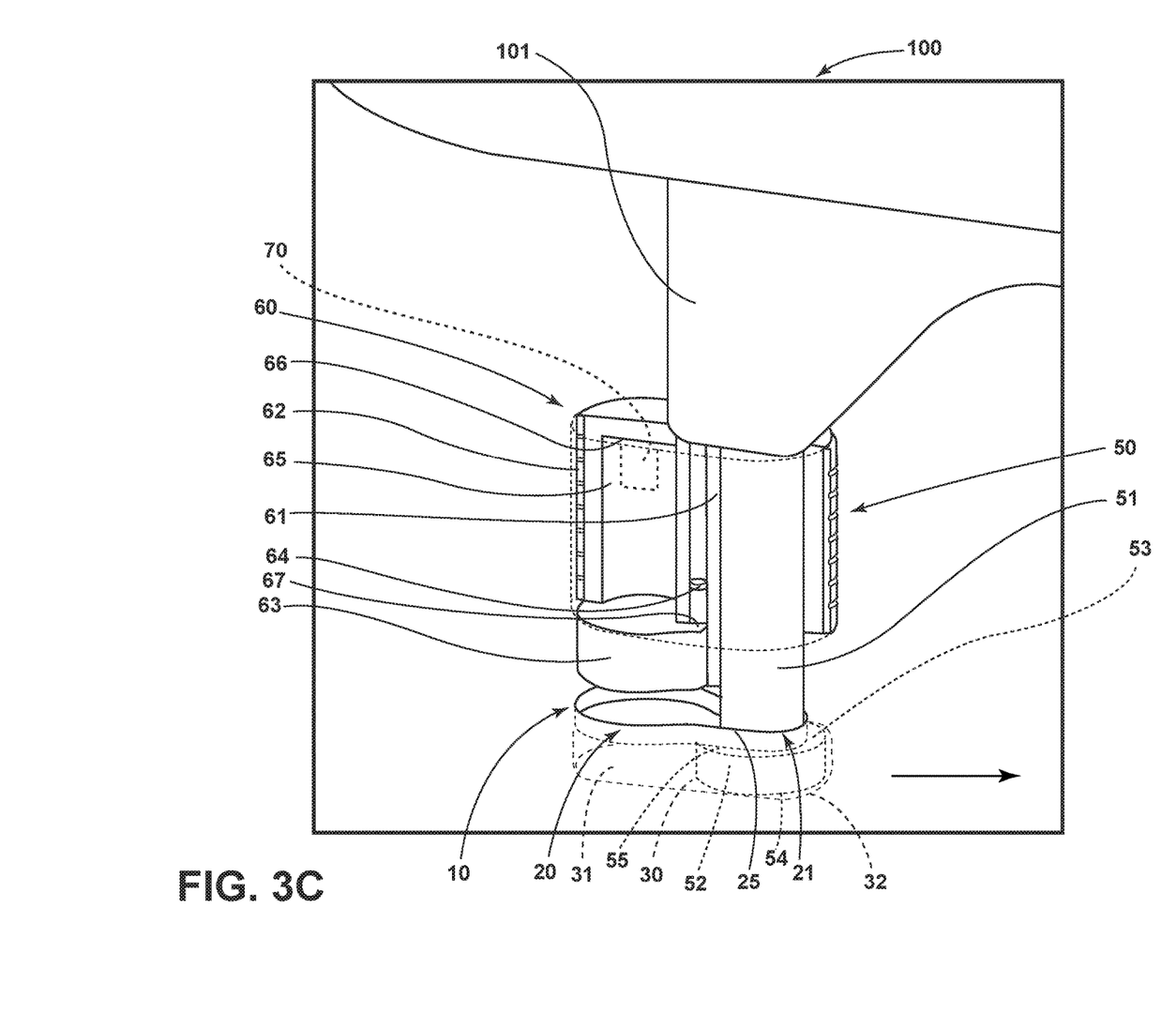
FIG. 3C illustrates the peg of the vehicular cabin module retained within a second groove of the slot.

The peg 50 may be slidably translatable between a first position and a second position. While in the first position, the first portion 31 of the channel 30 may accommodate the annular foot 52 and the peg 50 may be removable from the first groove 20 in response to an upward force applied to the vehicular module 100 (FIG. 3B). A force applied on the peg 50 in the direction of the second groove 21 may cause the annular foot 52 to slide within the channel 30 towards the second portion 32 of the channel 30 where it may be maintained in the second position (FIG. 3C). As such, the diameter of the elongated shaft 51 may be less than the diameter of the second groove 21 in order to enable sliding of the peg 50 from the first position to the second position. Further, the diameter of the annular foot 52 may be greater than the diameter of the second groove 21. Therefore, the upper surface 55 of the annular foot 52 may be frictionally engaged to a bottom surface of the first and second bowed ledges 24, 25 while the peg 50 is in the second position (FIG. 3C).

The first and second bowed ledges 24, 25 of the second groove 21 may prevent vertical displacement of the annular foot 52 when the peg 50 is retained within the second groove 21. The relative prevention of vertical displacement of the annular foot 52 may ensure that the vehicular module 100 remains coupled to the cabin floor 3. The peg 50 may then be moved from the second position to the first position in order to enable uncoupling of the vehicular module 100 from the cabin floor 3. Movement from the second position to the first position may require a force applied to the peg 50 or the vehicular module 100 in the direction of the first groove 20, causing the peg 50 to return to the first position. As such, a user may be free to remove the peg 50 from the cabin floor 3 once the peg 50 has been adjusted back to the first position (FIG. 3B). Although the annular foot 52 is shown as an annular member, the annular foot 52 may embody alternative designs capable of being retained by the slot 10. For instance, the annular foot 52 may include first and second flanges (not shown) protruding from the bottom portion of the elongated shaft 51. A top surface of the first and second flanges may be configured to frictionally engage the first and second bowed ledges 24, 25 in order to prevent vertical displace of the peg 50.

Figure 3D:
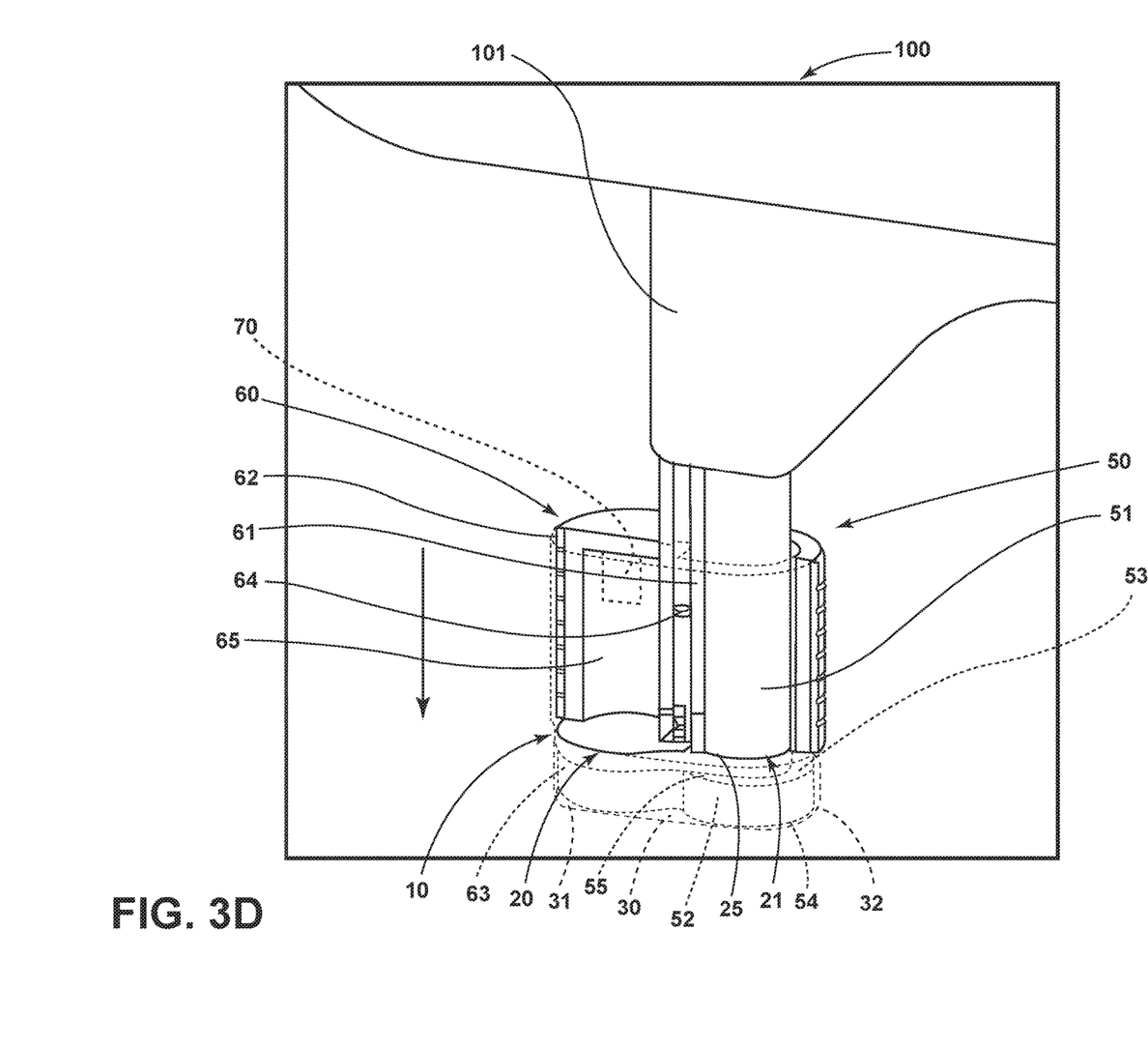
FIG. 3D illustrates the peg retained within the second groove and a locking device secured in a locked position preventing vertical and translational displacement of the peg.

With continued reference to FIGS. 3A-D, a locking device 60 may be slidably coupled to the peg 50. The locking device 60 may include a slide rail 61 which may slidably engage the shaft 51, enabling the locking device 60 to slide vertically about the peg 50. A handle 62 may be mounted to the slide rail 61 and includes a lower portion defining a locking device base 63. The locking device 60 may be adjustable between a locked position and an unlocked position. While in the unlocked position, the locking device 60 may be elevated above the slot 10 and the peg 50 may be configured to move between the first and second positions (FIG. 3C). The locking device 60 may be manually or electronically lowered into the locked position once the peg 50 has been adjusted to the second position. While the peg 50 is in the second position, the first groove 20 may be configured to accommodate the locking device base 63 once the locking device 60 is lowered. Once the locking device base 63 is lowered into the first groove 20 of the channel 30, the peg 50 may be retained in the second position and the locking device 60 may be configured to prevent translational movement of the peg 50 (FIG. 3D). While in the locked position, both translational and vertical movement of the peg 50 may be prevented and the peg 50 may be retained within the slot 10. In order to remove the peg 50 from the slot 10 and uncouple the vehicular module 100 from the cabin floor 3, the locking device 60 may be actuated from the locked position back to the unlocked position. Once the locking device 60 has been actuated to the unlocked position, the peg 50 may be moved into the first position and removed from the slot 10. The handle 62 may be configured to assist a user in adjusting the locking device 60 between the locked and unlocked positions.

Additional or alternative designs and/or dimensions of the slot are contemplated. For instance, the first and second slots may be more or less wide depending upon the durability of the cabin floor and its ability to resist jostling forces of the vehicular cabin modules. Although, the slot is generally depicted in the form of a pill slot formed within the cabin floor, the slot may include a different configuration so long as the slot is capable of retaining the vehicular module to the cabin floor. Furthermore, the slot may be adapted as a protuberance (not shown) raised off of the vehicle floor rather than formed within the cabin floor itself.

Still referring to FIGS. 3A-D, the locking device 60 may be operably coupled to an electronic actuator 70 configured to adjust the locking device 60 between the unlocked and locked positions. The electronic actuator 70 may be electronically coupled to a vehicle control panel configured to send a signal to the electronic actuator 70. The signal may be configured to control the actuator 70 to adjust the locking device 60 from the locked position to the unlocked position, and vice versa. A vehicle passenger may initiate a locking or unlocking control sequence via the control panel in order to send the signal to the actuator 70 to lock or unlock the locking device 60.

Additionally, the locking device 60 may include a stop 64 and/or locking feature which retains the locking device 60 in the locked or unlocked position. The locking device 60 may include a hollow cutaway 65 within the handle 62. The stop 64 may be adapted as a notch proximate the slide rail 61 configured to prevent the slide rail 61 from sliding about the peg 50 by frictionally engaging an upper surface 66 or a bottom surface 67 of the cutaway 65.

Figure 4A:
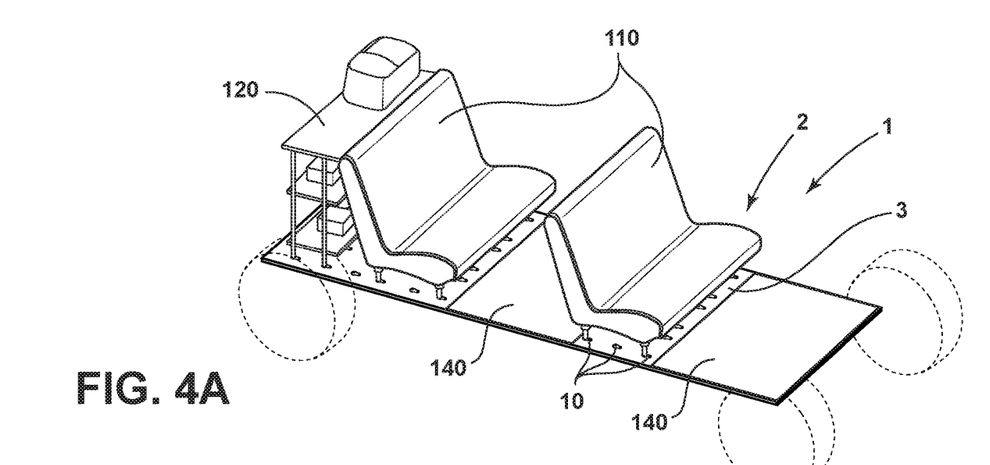
FIG. 4A is a perspective view of the vehicle cabin including a vehicular seating assembly module and a cargo retainer module coupled to the vehicular module attachment assembly.
Figure 4B:
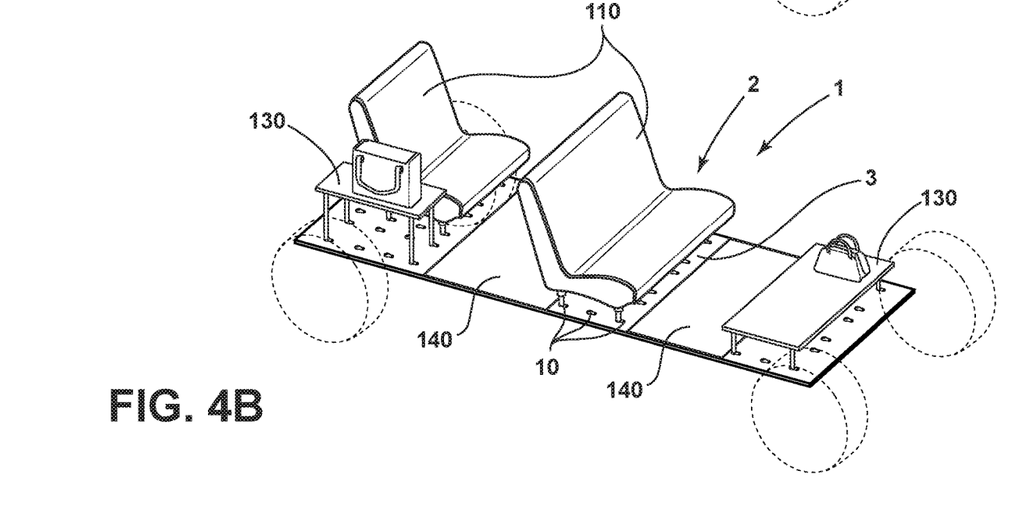
FIG. 4B is a perspective view of the vehicle cabin including the vehicular seating assembly module and a cabin furniture module.

Referring to FIGS. 4A and 4B, the vehicular module attachment assembly 1 may be configured to enable coupling of a variety of vehicular cabin modules to the cabin floor 3. In one embodiment, the vehicular module 100 may include a seating assembly module 110. The seating assembly module 110 may be configured to accommodate one or more passengers within the vehicle. Alternatively, the vehicular module attachment assembly 1 may be equally capable of coupling a cargo storage module 120 to the cabin floor 3 and/or a cabin furniture module 130 for enhancing a passenger's experience within the vehicle. Furthermore, a floor mat 140 may be placed upon the cabin floor 3 and configured to conceal at least a portion of the plurality of slots 10. Additional or alternative designs and/or configurations of the vehicular modules are contemplated. For instance, the vehicular module may include various attachment assemblies configured to retain various cargo items. Further, the vehicular modules may include entertainment modules that may be electronically coupled to the vehicle via the cabin floor. Moreover, the vehicular modules may include any applicable configurations adapted to enhance the capabilities of the vehicle cabin.

Figure 5:
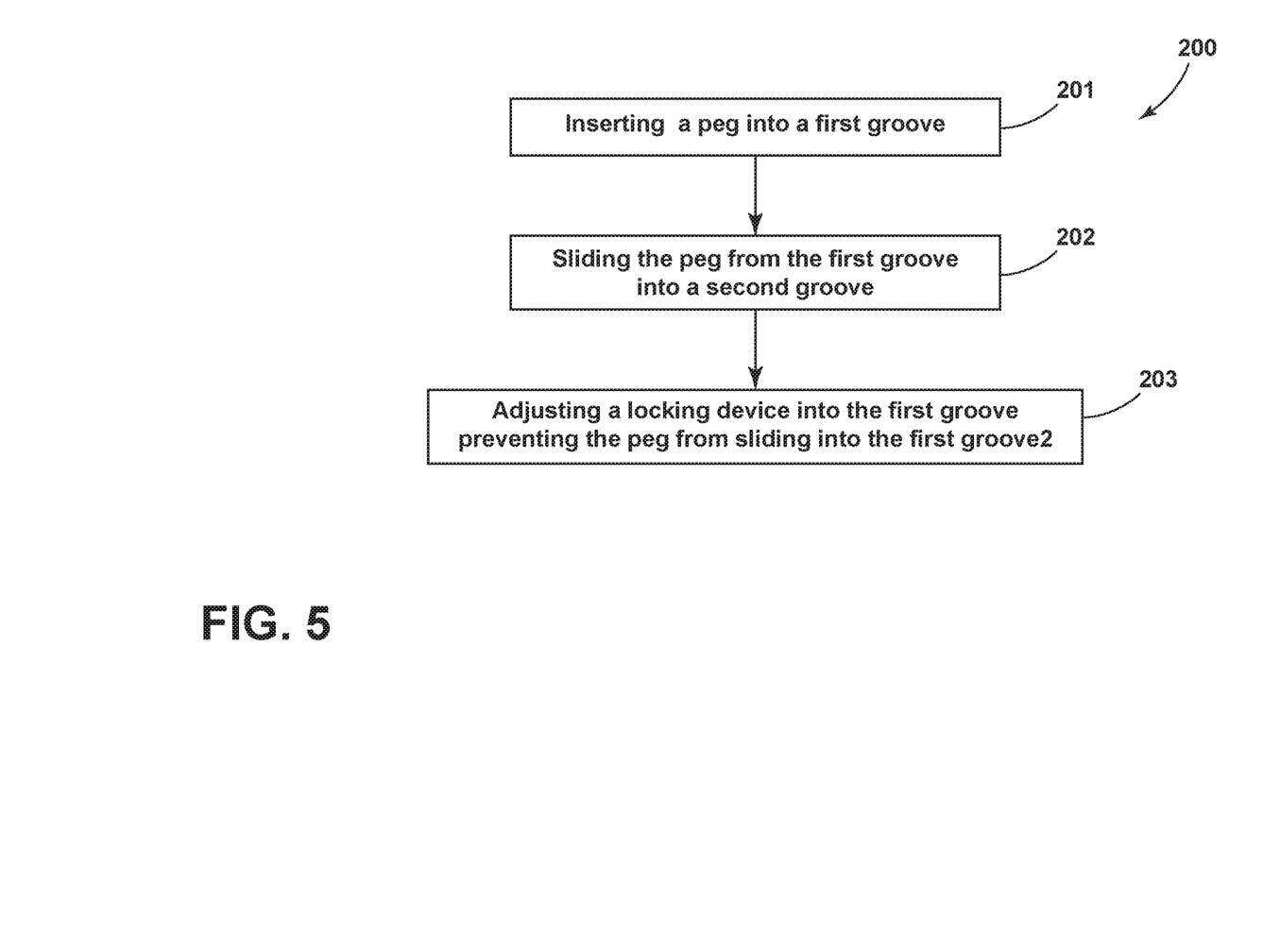
FIG. 5 is a block diagram of a method of installing a vehicular cabin module to the vehicular module retainer assembly of the present disclosure.

Referring to FIG. 5, a method 200 is shown for retaining the vehicular module 100 to the cabin floor 3, and may include steps 201, 202, and 203. The method 200 may include a first step 201 of inserting the peg 50 into the first groove 20 of the slot 10. During step 201, the annular foot 52 may be inserted into the first groove 20 of the slot 10 where it may then accommodated by the first portion 31 of the channel 30. Once inserted into the channel 30, the peg 50 may be free to slide between the first position and second position. Step 202 may involve sliding the peg 50 from the first groove 20 into the second groove 21 of the slot 10. During step 202, the annular foot 52 may slide from the first portion 31 of the channel 30 to the second portion 32 of the channel 30. The second groove 21 of the slot 10 may be configured to prevent vertical displacement of the peg 50 by frictionally engaging the upper surface 55 of the annular foot 52. At step 203, the locking device 60 may be adjusted into the first groove 20, preventing the peg 50 from sliding into the first groove 20. Further, the peg 50 may be both vertically and translationally retained upon the completion of step 203. As such uncoupling of the peg 50 from the slot 10 is prevented.

Accordingly, the disclosure advantageously provides a vehicular module attachment assembly and method of installation. The vehicular module attachment assembly may include a vehicular cabin module including a peg having a foot. A locking device may be slidably coupled to the peg. A slot may be formed in a cabin floor and may include first and second grooves configured to retain the foot. The locking device may adjust between an unlocked position wherein the peg may be slidable between the first and second grooves, and a locked position wherein the peg may be retained in the second groove. The diameter of the first groove may be wider than a diameter of the second groove. The second groove may be configured to prevent vertical displacement of the foot from the slot when the foot is retained in the second groove, and the locking device may be configured to prevent translational displacement of the peg when the locking device is in the locked position.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or number of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicular module attachment assembly, comprising:
   a vehicular cabin module comprising a peg comprising a foot;
   a locking device slidably coupled to the peg;
   a slot formed in a cabin floor comprising first and second grooves configured to retain the foot; and
   wherein the locking device adjusts between an unlocked position wherein the peg is slidable between the first and second grooves, and a locked position wherein the peg is retained in the second groove, wherein the locking device comprises a handle portion in connection with the locking device that slides the foot along the peg between the unlocked and locked positions.

2. The vehicular module attachment assembly of claim 1, wherein the second groove is configured to prevent vertical displacement of the foot from the slot when the foot is retained in the second groove.

3. The vehicular module attachment assembly of claim 2, wherein a diameter of the first groove is greater than a diameter of the second groove.

4. The vehicular module attachment assembly of claim 2, wherein a diameter of the foot is greater than the diameter of the second groove, and a diameter of the peg is less than the diameter of the second groove.

5. The vehicular module attachment assembly of claim 4, wherein the first and second grooves comprise a t-slot, the foot configured to slide within the t-slot between the first and second grooves.

6. The vehicular module attachment assembly of claim 1, wherein the cabin module is a seating assembly module.

7. The vehicular module attachment assembly of claim 1, further comprising:
   a plurality of slots formed in the cabin floor, the plurality of slots forming an array.

8. The vehicular module attachment assembly of claim 1, wherein the peg comprises a stop configured to prevent the foot from being displaced from the locked position.

9. A vehicular module attachment assembly, comprising:
   a plurality of vehicular cabin modules removably coupled to a cabin floor at a plurality of slots comprising first and second grooves, wherein the vehicular cabin modules comprise at least one of a seating assembly module, a cargo storage module, and a cabin furniture module;
   each of the plurality of modules comprising a peg insertable into the first groove and movable into the second groove vertically retaining the peg;
   a locking device coupled to the peg; and
   wherein the locking device is slidable to a lock position retaining the peg horizontally.

10. The vehicular module attachment assembly of claim 9, wherein each of the slots comprise a t-slot.

11. The vehicular module attachment assembly of claim 9, wherein the locking device is configured to prevent the peg from sliding into the first groove.

12. A method of retaining an interior vehicular module, comprising:
   inserting a peg of the module comprising a foot into a first groove of a cabin floor slot;
   sliding the peg from the first groove into a second groove of the slot, preventing vertical displacement of the peg; and
   adjusting a locking device coupled to the peg into the first groove, preventing the peg from sliding into the first groove, wherein adjusting the locking device comprises electronically actuating the locking device into the first groove.

13. The method of claim 12, further comprising: sending a signal from a vehicle control panel to an electronic actuator configured to adjust the locking device to the first groove.

14. The method of claim 12, wherein the interior vehicular module comprises a seating assembly module.

15. The method of claim 12, wherein the slot comprises a t-slot, and the foot is configured to slide within the t-slot.

16. The method of claim 12, further comprising: preventing displacement of the module from the slot.

17. The vehicular module attachment assembly of claim 1, wherein the locking device slides along the peg and engages the first groove in the locked position.

* * * * *